Feb. 3. 1925.  1,524,821
W. E. GOULD
AUTOMOBILE CURTAIN OR PANEL
Filed March 17, 1924
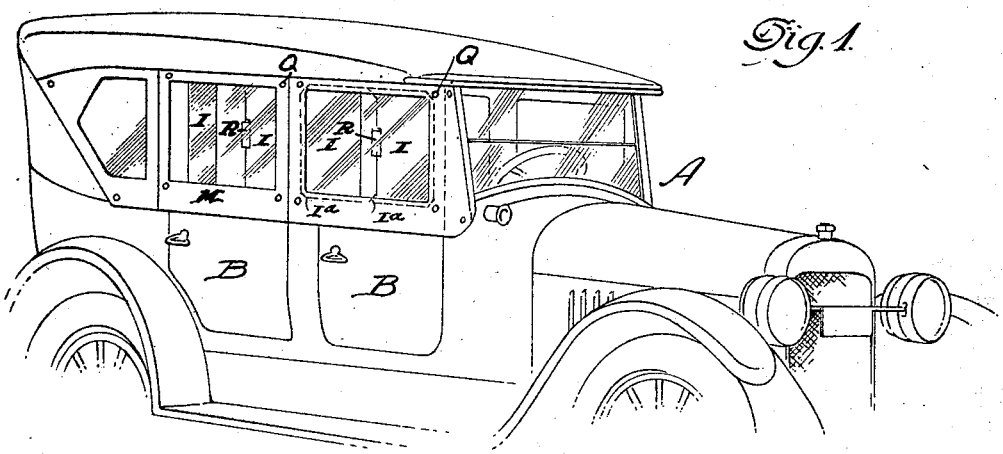
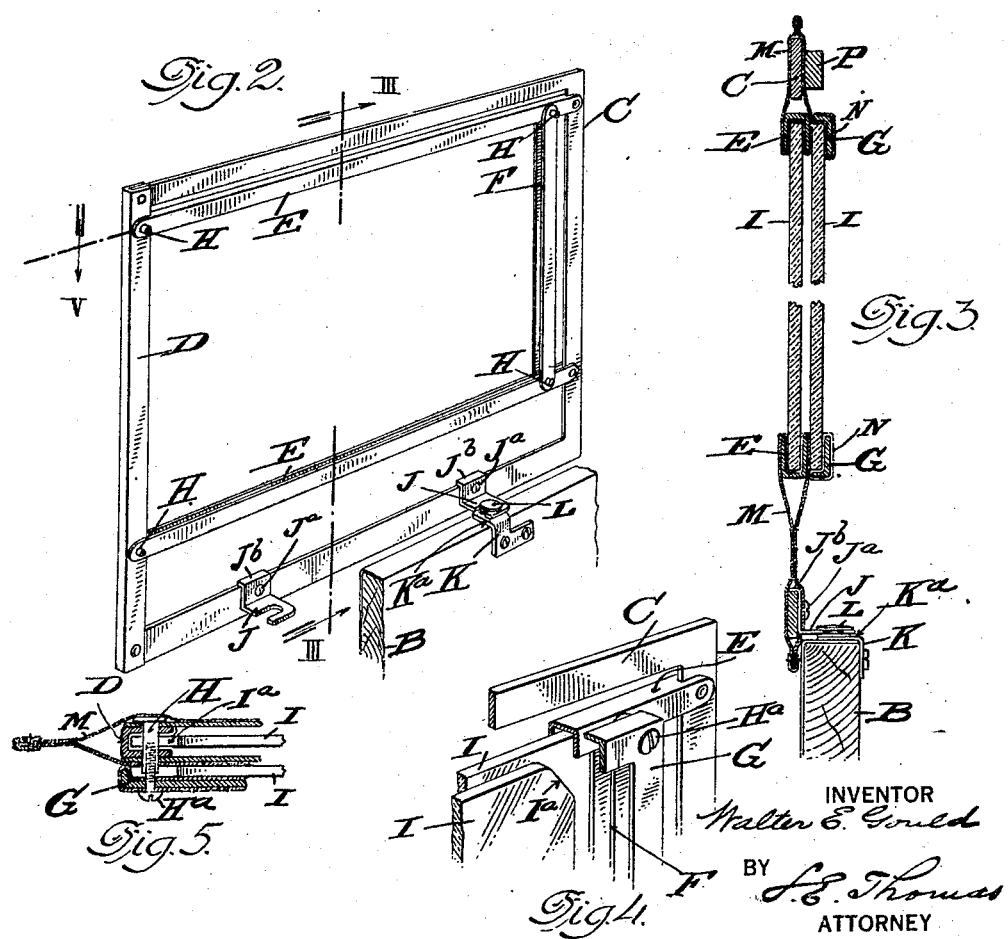
INVENTOR
Walter E. Gould
BY
J. E. Thomas
ATTORNEY Patented Feb. 3, 1925.

1,524,821

UNITED STATES PATENT OFFICE.

WALTER E. GOULD, OF DETROIT, MICHIGAN, ASSIGNOR TO BINDER-GOULD, OF DETROIT, MICHIGAN, A COPARTNERSHIP CONSISTING OF ALBERT E. BINDER AND WALTER E. GOULD.

AUTOMOBILE CURTAIN OR PANEL.

Application filed March 17, 1924. Serial No. 699,797.

*To all whom it may concern:*

Be it known that I, WALTER E. GOULD, a citizen of the United States, residing at Detroit, county of Wayne, State of Michigan, have invented a certain new and useful Improvement in Automobile Curtains or Panels; and declare the following to be a full, clear, and exact description of the same, such as will enable others skilled in the art to which it pertains to make and use the same, reference being had to the accompanying drawings, which form a part of this specification.

My invention relates to an improvement in automobile curtains or panels shown in the accompanying drawings and more particularly described in the following specification and claims.

The primary object of this invention is to provide an automobile curtain or panel employed in connection with other panels in the construction of an automobile top, it being especially designed for use in conjunction with the doors of a touring car,—the construction being such that the glass may be shifted to provide for ventilation.

Another feature of the invention comprises a simple and inexpensively constructed frame adapted to support the glass in the curtain panel.

A further object of the invention consists in the means for detachably securing the lower edge of the frame to the door of the vehicle, the construction being such that upon opening the door the panel will open with it.

A further object of the invention is to provide means whereby the detachable panel will not become accidentally disengaged from the door.

A further object of the invention is to provide shock absorbing means that will serve to prevent the fracture of the glass resulting from jar occasioned through closing the door.

A further object of the invention is to provide suitable guides for the glass forming the divided window, the construction being such that the sections may be respectively shifted without danger of interfering with each other.

A further object of the invention is to provide a frame for supporting the glass constructed of commercial iron in which an angle iron is combined with a channel iron in such a manner that two adjacent channels are formed for the respective lights of glass forming the window,—the arrangement being such that the lights are separated by only a single channel wall that they may be closely adjacent each other and thus prevent the entry of drafts when the windows are closed.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a perspective view of a motor vehicle of the touring car type, showing window panel curtains attached to the doors in conjunction with the usual side curtains of the car.

Figure 2 is a perspective view of a frame in which are mounted channel and angle iron members bolted together to form two channels for supporting separate lights of glass;—the angle iron members have been omitted in this view to more clearly show the construction of the channel iron members forming one of the glass supporting frames.

Figure 3 is a cross-sectional view of the panel taken through both the channel and the angle iron members on or about line III—III of Figure 2,—showing the curtain attached to the door of a vehicle and bearing against a horizontal supporting member forming part of the top frame.

Figure 4 is a fragmentary detail view of one corner of the frame showing the channel iron secured to the frame and with the angle iron attached to the channel iron, also indicating the glass supported in the groove of the channel and angle irons—the corners of the glass being cut off to allow for the passage of bolts and screws, connecting the angle iron with the channel iron.

Figure 5 is a horizontal sectional view of a detail of construction, taken on or about line V of Figure 2.

Referring now to the letters of reference placed upon the drawings:

A denotes an automobile, B its doors hinged to the body of the car.

C designates a U-shaped frame preferably formed of sheet metal.

D indicates a channel iron bolted to the ends of the U-shaped frame.

E, E, represent channel irons bolted to the frame C, and to the channel iron D.

F denotes a channel iron bolted to the upper and lower channel members E, E.

G designates angle irons bolted to the channel iron members D, E, E, and F, by tubular bolts H and screws H$^a$ extending through the several elements adjacent the corners of the frame.

I, I, indicate lights of glass respectively lodged in the grooves formed by the channel and angle irons,—the corners of the lights of glass being cut away as at I$^a$ that they may not interfere with the passage of the bolt H and screw H$^a$.

By employing an angle iron in conjunction with a channel member the separate lights of glass forming the window are brought into close relation to each other so that when the window is closed a draft is not apt to enter between the overlapping edges of the glass.

J represents hooks formed of sheet metal secured to the lower member of the frame by a single bolt J$^a$, and as a matter of good mechanical construction are provided with a flange J$^b$ overlapping the edge of the frame that a single bolt or rivet may secure the hook to the frame and prevent its turning thereon.

K denotes a cooperating element also formed of sheet metal preferably attached to the inner wall of the door adjacent its upper edge having a bent portion K$^a$ overlapping the edge of the door to which is attached a stud L to receive the hooks J, J, attached to the frame.

M designates the curtain fabric covering the frame C, and channel members supporting the glass. The fabric overlaps the walls of the channel members and projects inwardly to form a cushion for the lights of glass supported therein.

The angle iron member is also covered with a fabric N overlapping its outer surface and extending between the glass and inner wall of the angle iron forming with the curtain fabric a cushion for the lights of glass supported in the channel provided between the angle iron and channel members.

P indicates the usual horizontal member of the frame forming an automobile top, against which the upper member of the frame C covered by the curtain fabric is brought to bear, whereby shocks occasioned through slamming the door may be absorbed without danger of fracturing the glass.

The marginal edge of the curtain fabric is provided with a snap hook engaging device Q,—diagrammatically indicated in Figure 1 of the drawings. These devices serve to prevent the accidental withdrawal of the hooks J when in engagement with the stud L of the cooperating member K, attached to the edge of the door.

R, R, represent finger clips diagrammatically indicated in Figure 1, attached to the glass to facilitate sliding the latter in the supporting channel members when it is desired to open the windows for ventilation.

While I prefer to employ the element K attached to the door of the car with its stud L it will be obvious that an engaging stud may be secured in the edge of the door if desired. I have found, however, in practice that the device shown is preferable in the majority of cases.

It will be noted upon referring to Figure 3 that the upper member of the supporting frame C lies adjacent to and bears against the horizontal member P of the automobile top, thus shocks occasioned by slamming the door are absorbed, thereby relieving the glass supported in the channel frames of undue stress.

Having thus described my invention what I claim is:

1. An automobile curtain comprising a cloth body having an opening, a supporting frame surrounding the opening secured to the curtain adjacent the marginal edges of the cloth body, channel members bolted to the supporting frame forming a frame within the supporting frame, angle irons bolted to the channel members forming a channel groove adjacent the groove of the channel members, transparent slidable panels respectively mounted in the groove of the channel and in the groove formed by the angle iron members, said cloth body covering the supporting frame and channel members and means for securing the supporting frame to the door of a vehicle.

2. An automobile curtain comprising a cloth body having an opening, a supporting frame secured to the curtain adjacent the marginal edges of the cloth body, channel members bolted to the supporting frame forming a rectangular frame within the supporting frame, angle irons bolted to the sides of the channel members forming grooves adjacent the grooves of the channel frame, transparent slidable panels respectively mounted in the grooves of the channel frame and in the grooves formed by the angle iron members, said cloth body covering the supporting frame and channel members, hook-shaped elements secured to the supporting frame and cooperating engaging members adapted to be secured to a door of a vehicle to receive the hook-shaped elements, whereby the supporting frame is secured to the door that it may open therewith.

3. An automobile curtain having an opening, a U-shaped supporting frame secured to the curtain adjacent its marginal edges, a channel member connecting the ends of the U-shaped frame, channel members bolted to the supporting frame forming a rectangular frame within the supporting frame, angle irons bolted to the sides of the channel members forming grooves adjacent the grooves of the channel frame, slidable glass panels respectively mounted in the grooves of the channel frame and in the grooves formed by the angle iron members, hook-shaped elements secured to the supporting frame having a flange overlapping the flange of the frame, cooperating engaging members adapted to be secured to the inner side of the door of a vehicle bent to overlap the upper edge of the door and provided with a projecting stud to receive the hook-shaped elements secured to the supporting frame and means for engaging the curtain adapted to maintain the hook-shaped elements in engagement with their cooperating studs, whereby they may be held against accidental disengagement.

In testimony whereof I sign this specification in the presence of two witnesses.

WALTER E. GOULD.

Witnesses:
S. E. THOMAS,
R. V. CANN.